(12) United States Patent
Kaser

(10) Patent No.: US 8,449,259 B1
(45) Date of Patent: May 28, 2013

(54) LIGHTNING PROTECTION FOR WIND TURBINE BLADES, AND ASSOCIATED SYSTEMS AND METHODS

(75) Inventor: Kenneth Kaser, Huntington Beach, CA (US)

(73) Assignee: Modular Wind Energy, Inc., Huntington Beach, CA (US)

( * ) Notice: Subject to any disclaimer, the term of this patent is extended or adjusted under 35 U.S.C. 154(b) by 0 days.

(21) Appl. No.: 13/472,402

(22) Filed: May 15, 2012

(51) Int. Cl.
F03D 9/00 (2006.01)

(52) U.S. Cl.
USPC ...................................... 416/146 R; 416/230

(58) Field of Classification Search
USPC .. 416/39, 146 R, 230; 244/1 A, 132; 361/218
See application file for complete search history.

(56) References Cited

U.S. PATENT DOCUMENTS

| | | | |
|---|---|---|---|
| 7,040,864 | B2 | 5/2006 | Johansen et al. |
| 7,494,324 | B2 | 2/2009 | Hibbard |
| 7,729,100 | B2 * | 6/2010 | Llorente Gonzalez et al. .......................... 361/220 |
| 7,883,321 | B2 | 2/2011 | Bertelsen |
| 8,142,157 | B2 | 3/2012 | Kita et al. |
| 8,191,255 | B2 | 6/2012 | Kristensen et al. |
| 8,226,866 | B2 | 7/2012 | Arelt |
| 2009/0139739 | A1 * | 6/2009 | Hansen .............................. 174/2 |
| 2010/0090472 | A1 | 4/2010 | Berthelsen |
| 2010/0272570 | A1 * | 10/2010 | Arocena De La Rua et al. .......................... 416/146 R |
| 2010/0329865 | A1 | 12/2010 | Hibbard |
| 2011/0182731 | A1 * | 7/2011 | Naka et al. ........................ 416/1 |

OTHER PUBLICATIONS

"Reliable Design—LM Wind Power: Built-in reliability designed right from the start," http://www.lmwindpower.com/Blades/Products/Reliability/Design.aspx, accessed Jan. 25, 2012, 1 page.
"Lightning—LM Wind Power: Effective Lightning protection," http://www.lmwindpower.com/Blades/Products/Lightning.aspx, accessed Jan. 25, 2012, 2 page.

* cited by examiner

Primary Examiner — Edward Look
Assistant Examiner — Jason Davis
(74) Attorney, Agent, or Firm — Perkins Coie LLP

(57) ABSTRACT

Lightning protection for wind turbine blades, and associated systems and methods are disclosed. A system in accordance with a particular embodiment includes an external skin having a hub region and a tip region, at least one electrically exposed, electrically conductive element positioned at the external skin, and an electrically conductive cable positioned inwardly from the external skin and conductively coupled to the at least one electrically exposed, electrically conductive element. A covering is positioned around the cable and has a first dielectric value at a first portion of the cable positioned toward the hub region and a second dielectric value higher than the first dielectric value at a second portion of the cable positioned toward the tip region.

30 Claims, 6 Drawing Sheets

LIGHTNING PROTECTION FOR WIND TURBINE BLADES, AND ASSOCIATED SYSTEMS AND METHODS

TECHNICAL FIELD

The present technology is directed generally to lightning protection for wind turbine blades, and associated systems and methods.

BACKGROUND

As fossil fuels become scarcer and more expensive to extract and process, energy producers and users are becoming increasingly interested in other forms of energy. One such energy form that has recently seen a resurgence is wind energy. Wind energy is typically harvested by placing a multitude of wind turbines in geographical areas that tend to experience steady, moderate winds. Modern wind turbines typically include an electric generator connected to one or more wind-driven turbine blades, which rotate about a vertical axis or a horizontal axis.

One characteristic of conventional wind turbine blades is that they can attract potentially damaging lightning strikes. Accordingly, the wind turbine blade industry has developed techniques for mitigating lightning damage. FIG. 1A is a partially schematic, plan view of a representative conventional wind turbine blade 10 having a lightning protection system in accordance with the prior art. In particular, the wind turbine blade 10 can include a plurality of metallic or otherwise electrically conductive receptors 11 that are mounted flush or otherwise at the skin 12 of the blade 10. The conductive receptors 11 act as lightning rods during operation of the blade 10 to convey electrical current resulting from a lightning strike to the interior of the blade 10 and then to ground, and/or from ground to sky in the case of a ground strike.

FIG. 1B is a partially schematic, cross-sectional illustration of a portion of the blade 10, taken substantially along line 1B-1B of FIG. 1A. As shown in FIG. 1B, each receptor 11 can extend into the interior of the blade 10 and can be connected to an electrically conductive block 13. The conductive blocks 13 corresponding to each receptor 11 can be interconnected with a lightning cable 14. The cable 14 can extend along the length of each blade 10 to a hub of the turbine (not shown in FIGS. 1A-1B), and from the hub down the wind turbine pylon or tower to ground.

In general, larger (e.g., longer) wind turbine blades produce energy more efficiently than do short blades. Accordingly, there is a desire in the wind turbine blade industry to make blades as long as possible. However, long blades create several challenges. For example, long blades are heavy and therefore have a significant amount of inertia, which can reduce the efficiency with which the blades produce energy, particularly at low wind conditions. In addition, long blades are difficult to manufacture and in many cases are also difficult to transport. Still further, longer wind turbine blades present more exposed area and extend to higher elevations when in use, which increases the likelihood for a damaging lightning strike. Accordingly, a need remains for large, efficient, lightweight wind turbine blades, and improved methods for protecting such blades from lightning damage.

DETAILED DESCRIPTION

The present disclosure is directed generally to lightning protection for wind turbine blades, and associated systems and methods of manufacture, assembly, and use. Several details describing structures and/or processes that are well-known and often associated with wind turbine blades are not set forth in the following description to avoid unnecessarily obscuring the description of the various embodiments of the technology. Moreover, although the following disclosure sets forth several embodiments, several other embodiments can have different configurations and/or different components than those described in this section. In particular, other embodiments may have additional elements and/or may lack one or more of the elements described below with reference to FIGS. 2-6. In FIGS. 2-6, many of the elements are not drawn to scale for purposes of clarity and/or illustration.

Figure 1A:
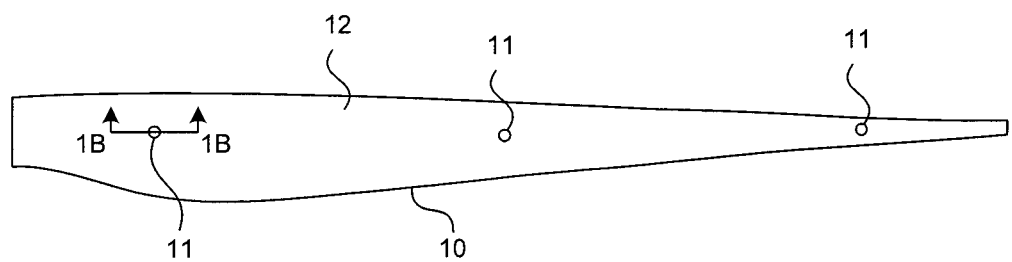
FIG. 1A is a partially schematic plan view of a wind turbine blade having a conventional lightning protection system in accordance with the prior art.
Figure 1B:
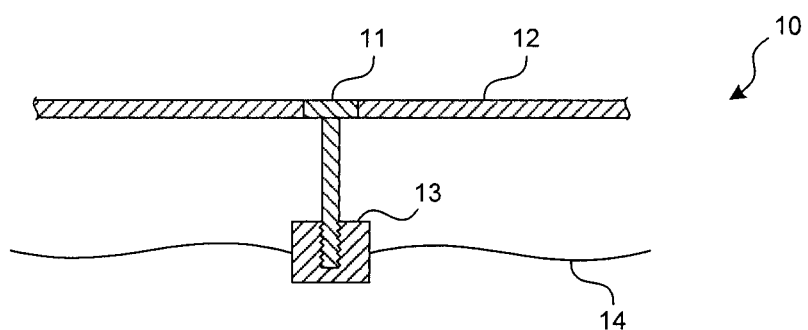
FIG. 1B is a partially schematic, cross-sectional illustration of a portion of the blade shown in FIG. 1A, taken substantially along line 1B-1B of FIG. 1A.

One drawback with blades having a lightning protection system of the type described above with reference to FIGS. 1A and 1B is that the system may not adequately protect the blade from lightning strikes. In particular, the receptors 11 are highly localized and accordingly, may not adequately attract electrical current resulting from a lightning strike. Instead, such electrical currents may flow to other portions of the blade skin 12, thus damaging the skin and/or structure of the blade. In addition, the ability of each receptor 11 to attract current during a lightning strike may depend upon the rotational position of the blade and/or the pitch angle of the blade. Still further, it may be difficult during assembly to accurately drill holes through the skin 12 and locate the conductive blocks 13 below the skin. This operation can accordingly add time and cost to the manufacturing process, and if not performed accurately, can result in inadequate lightning protection for the blade.

Figure 2:
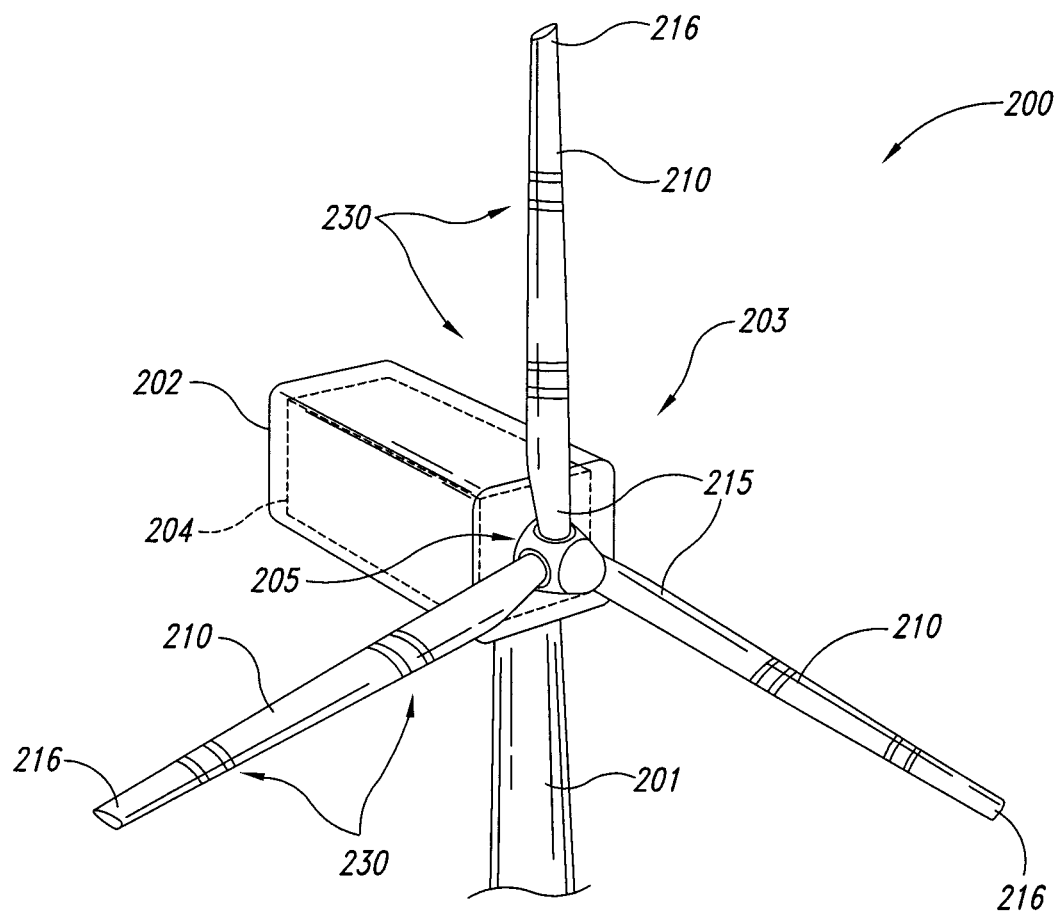
FIG. 2 is a partially schematic, isometric illustration of a wind turbine system having blades configured in accordance with an embodiment of the present technology.

FIG. 2 is a partially schematic, isometric illustration of an overall system 200 that includes a wind turbine 203 having blades 210 configured in accordance with an embodiment of the present technology. The wind turbine 203 includes a tower 201 (a portion of which is shown in FIG. 2), a housing or nacelle 202 carried at the top of the tower 201, and a generator 204 positioned within the housing 202. The generator 204 is connected to a shaft or spindle having a hub 205 that projects outside the housing 202. The blades 210 each include a hub attachment portion 215 at which the blades 210 are connected to the hub 205, and a tip portion 216 positioned radially or longitudinally outwardly from the hub 205. In an embodiment shown in FIG. 2, the wind turbine 203 includes three blades 210 connected to a horizontally-oriented shaft. Accordingly, each blade 210 is subjected to cyclically varying loads as it rotates between the 12:00, 3:00, 6:00 and 9:00 positions, because the effect of gravity is different at each position. In other embodiments, the wind turbine 203 can include other numbers of blades 210 connected to a horizontally-oriented shaft, or the wind turbine 203 can have a shaft with a vertical or other orientation. In any of these embodiments, the blades 210 can have a lightning protection system 230 and other structures configured in accordance with the arrangements described in further detail below with reference to FIGS. 3-6.

Figure 3:
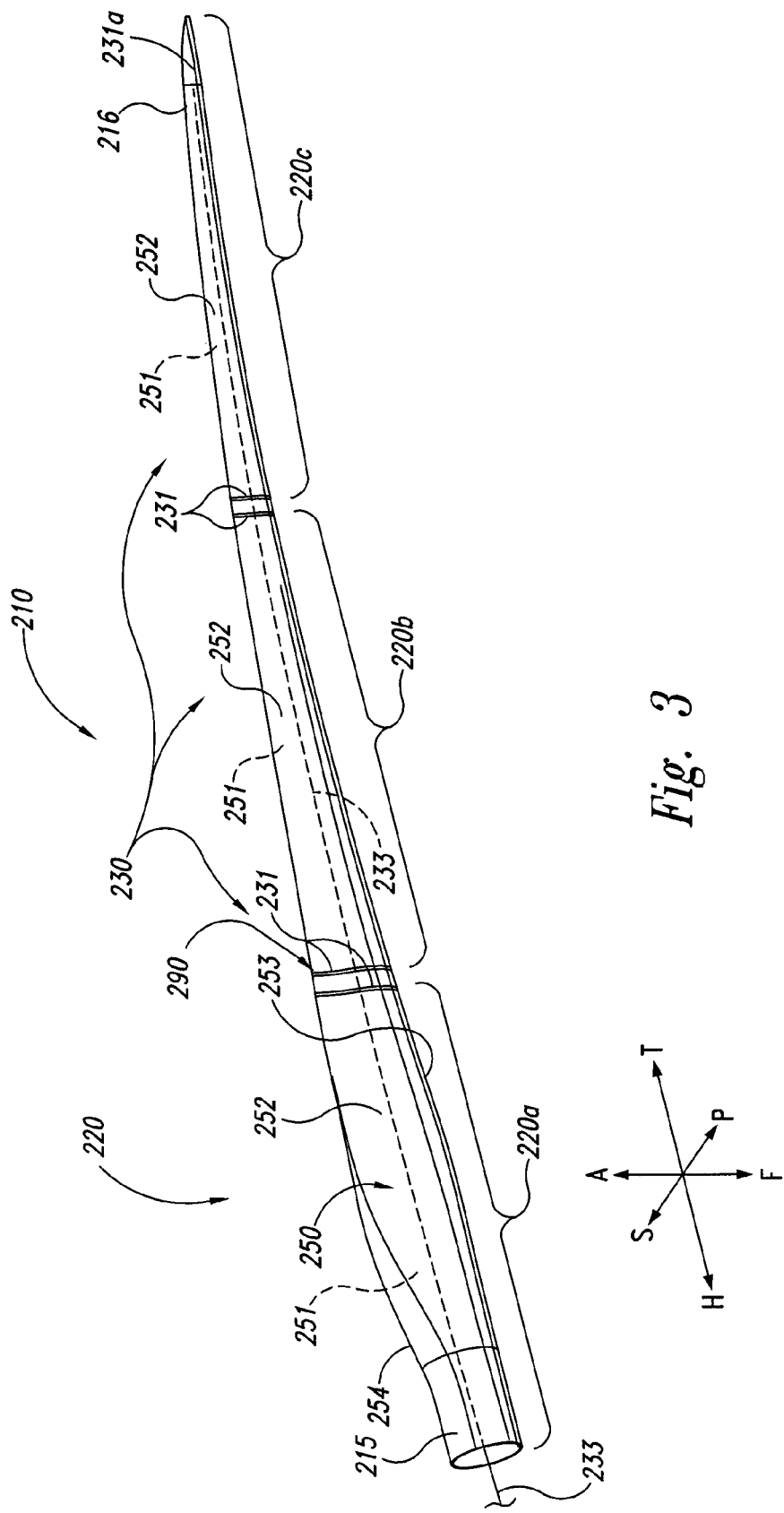
FIG. 3 is a partially schematic, isometric illustration of a wind turbine blade having a lightning protection system in accordance with an embodiment of the present technology.

FIG. 3 is a partially schematic, isometric illustration of a representative one of the blades 210 described above with reference to FIG. 2. The blade 210 includes multiple segments 220, for example, a first segment 220a, a second segment 220b, and a third segment 220c. The segments 220 extend along a spanwise or axial axis from the hub attachment portion 215 to the tip portion 216. The spanwise axis is represented in FIG. 3 as extending in a hub direction H and a tip direction T. The blade 210 also extends along a thickness axis in a pressure direction P and a suction direction S, and further extends along a chordwise axis in a forward direction F and an aft direction A. The outer surface of the blade 210 is formed by a skin 250 that can include several skin sections. The skin sections can include a suction side skin 251, a pressure side skin 252, a leading edge skin 253, and a trailing edge skin 254. The number of skin sections can change along the length of the blade 210. For example, the second and third segments 220b, 220c can be formed from two skin sections (e.g., a pressure side skin 252 and a suction side skin 251).

In a particular embodiment, the lightning protection system 230 includes multiple, electrically exposed, electrically conductive elements positioned along the length of the blade 210. In a further particular embodiment, the elements include spaced-apart panels or spaced-apart strips 231. As used herein, the term strip refers generally to a relatively thin element having a length greater than its width. The term panel refers generally to a relatively thin, sheet-like element, having a thickness less than its length or width. In general, panels and strips can conform or otherwise mate with a curved underlying surface. Each strip 231 is connected internally to a cable 233 that extends along at least part of the length of the blade 210, e.g., from the tip portion 216 to the hub attachment portion 215. In a particular embodiment, the strips 231 can be located at the connections between neighboring blade segments 220. Accordingly, the strips 231 can perform the dual function of providing lightning protection and providing a cover over adjoining sections of the skin 250. An outermost element toward the tip 216 of the blade can include a panel 231a that extends over a greater spanwise extent than the strips 231 to account for the increased likelihood for a lightning strike in that region of the blade 210. Further details of the lightning protection system 230, the internal structure of the blade 210, the connections between the internal structure and the skin 250, and the connections between neighboring segments 220 are described below with reference to FIGS. 4-6.

Figure 4:
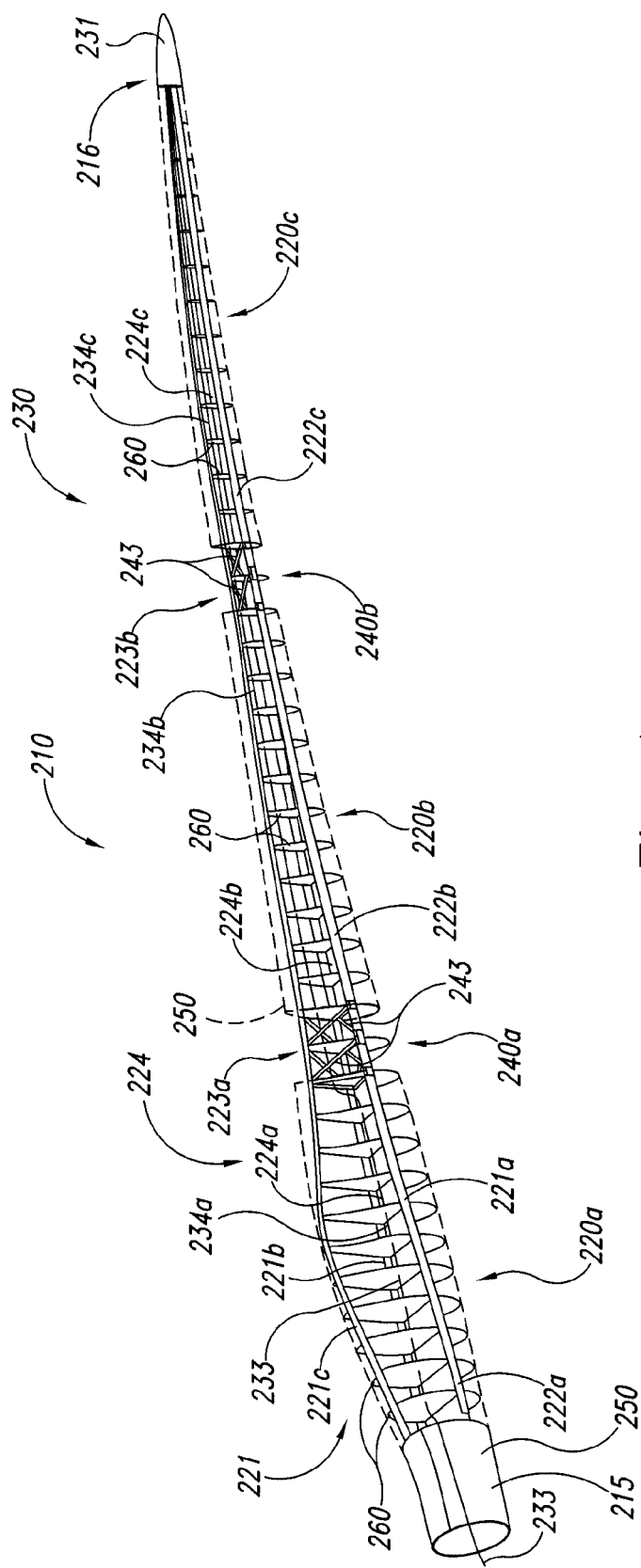
FIG. 4 is a partially schematic, isometric illustration of multiple wind turbine blade segments assembled to include a lightning protection system in accordance with an embodiment of the present technology.

FIG. 4 illustrates the blade 210 with portions of the skin 250 shown in dashed lines for purposes of illustration. In this embodiment, the blade 210 includes multiple ribs 260 located at each of the segments 220a, 220b and 220c. The ribs 260 are connected to one or more spars 221, e.g., three spars 221, shown as a first spar 221a, a second spar 221b, and a third spar 221c that extend along the length of the blade 210. Accordingly, each of the spars 221 includes a first spar portion 222a at the first segment 220a, a second spar portion 222b at the second segment 220b, and a third spar portion 222c at the third segment 220c. Each segment 220 also includes a corresponding shear web 224, illustrated as a first shear web 224a, a second shear web 224b, and a third shear web 224c. The spar portions 222 in neighboring sections 220 are connected at connection regions 223 (e.g., a first connection region 223a and a second connection region 223b) to transmit loads from one segment 220 to the next. The shear webs 224 are not continuous across the connection regions 223. Instead, load-bearing structures 240 (shown as a first structure 240a and a second structure 240b) at each connection region 223 are connected between the neighboring segments 220 to transmit shear loads from one segment 220 to the next. In particular embodiments described below, the load-bearing structures 240 include truss structures, and in other embodiments, the load-bearing structures 240 can include arrangements other than truss structures. Truss structures can be advantageous in certain embodiments due to the relatively low weight and high load-bearing capabilities of such structures.

As shown in FIG. 4, individual structures 240 can include multiple truss members 243 that, in conjunction with other elements of the structure 240, convey loads between the neighboring segments 220. In a particular embodiment, the truss members 243 and/or other components of the load-bearing structure 240 are electrically conductive (e.g., formed from an electrically conductive metal or other material) so as to convey electrical current generated by a lightning strike along the cable 233 toward the hub attachment portion 215. Accordingly, the structure 240 can form an electrical link between portions of the cable 233 positioned in different portions of the blade 210. The cable 233 can include corresponding multiple portions 234, e.g., a first cable portion 234a at the first segment 220a, a second cable portion 234b at the second segment 220b, and a third cable portion 234c at the third segment 220c.

In a particular embodiment, each of the cable portions 234a-234c can have generally the same composition and construction. In other embodiments, different cable portions can have a different composition and/or structure, depending on where along the length of the blade 210 the cable portion is positioned. For example, each cable portion can include a conductive core (e.g., a solid or braided metal core formed from copper, aluminum and/or another suitable conductor) surrounded by an insulative cover or coating (formed from polyethylene or another suitable dielectric material). The insulation provided around each cable portion 234 can be different depending on where the particular cable portion is located. In a particular embodiment, the outermost cable portion 234c can have a relatively high dielectric value (e.g., rated at from about 5 kV to about 15 kV, and in a particular embodiment, about 15 kV) while the innermost cable portion 234a can have a lower dielectric value (e.g., rated at from zero to about 1000 volts and in a particular embodiment, about 600 volts). The intermediate cable portion 234b can have an intermediate dielectric value, or a value similar to that of the innermost portion 234a or the outermost portions 234c. In other embodiments, the foregoing values can be different depending upon the particular installation details. The transition from one dielectric value to another can be a step transition or a non-step (e.g., gradual) transition. The cable portions can be part of a continuous unbroken cable or, as discussed in greater detail below, can be discontinuous but electrically coupled to each other via one or more electrically conductive intervening elements or structures. In particular embodiments, the dielectric characteristics of the cable covering/coating can be controlled by the thickness and/or other geometric characteristics of the material (e.g., with thicker materials generally having a higher dielectric value than thinner materials of the same composition). In other embodiments, the composition of the material itself can be different, alone or in combination with a different material thickness, to achieve different dielectric characteristics. In any of these embodiments, the dielectric value that varies from one cable portion to another can include dielectric strength. As used herein, the term dielectric strength refers generally to the ability of an insulating material to withstand an electric field without breaking down, e.g., the maximum electric field strength that the material can withstand without causing its insulating properties to fail.

An advantage of the foregoing feature is that it can provide high dielectric strength insulation in regions that benefit from such an insulation, and low dielectric strength insulation in regions that do not justify the generally higher cost and/or weight of a high dielectric strength insulation. Accordingly, using different dielectric strength insulation at different locations of the blade 210 can reduce the cost of the blade 210. In use, it is expected that the high dielectric strength insulation at the outer portions of the blade 210 can at least restrict and in many cases prevent electrical current from entering the cable 233 via conductive paths other than those provided by the conductive strips 231 (FIG. 3) or other conductive elements at the surface of the blade 210. As a result, the likelihood that electrical current can pass from the skin 250 to the cable 233 via arcing can be reduced and can accordingly reduce the likelihood for forming holes, pits, and/or other disruptions in the continuity of the skin 250. By the same token, the radially inward portions of the blade, which are less likely to be subject to a lightning strike, can have a lower cost, lower dielectric strength cable covering. Further details of an arrangement by which embodiments of suitable lightning protection systems 230 are constructed are described below with reference to FIGS. 5 and 6.

Figure 5:
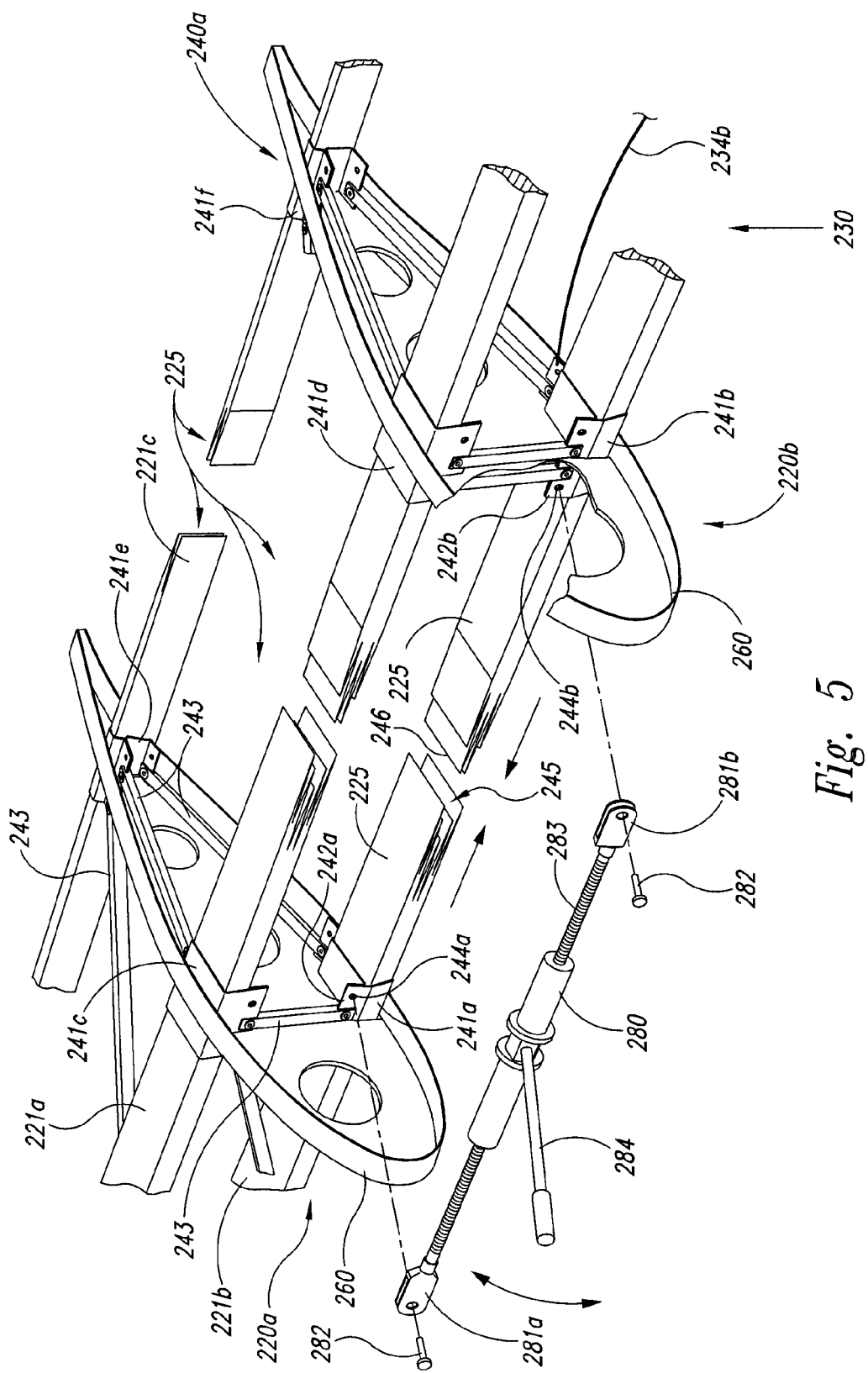
FIG. 5 is a partially schematic illustration of wind turbine blade segments in the process of being assembled in accordance with an embodiment of the present technology.

FIG. 5 is an enlarged, partially schematic isometric illustration of a method for joining the first blade segment 220a to the second blade segment 220b, and providing electrical continuity for the lightning protection system 230 in accordance with an embodiment of the present technology. As this view illustrates, opposing end portions 225 of the corresponding spars 221a, 221b, 221c are initially separated from each other but are axially aligned. Referring first to the second spar 221b, a first truss attachment member 241a on the first blade segment 220a can include a first lug or truss attachment portion 242a having a first aperture 244a. Similarly, an opposite, second truss attachment member 241b on the second blade segment 220b can include a corresponding second truss attachment portion 242b having a second aperture 244b. Third and fourth truss attachment members 241c, 241d on the first spar 221a, and fifth and sixth truss attachment members 241e, 241f on the third spar 221c, can also include similar truss attachment members having corresponding apertures.

To join the first blade segment 220a to the second blade segment 220b, a push/pull device 280 (e.g., a manual or automatic spreader bar, come-along, hydraulic device, etc. that can pull objects together and/or push objects apart at a controlled rate and with sufficient force) is temporarily installed between the corresponding truss attachment portions 242a and 242b. More specifically, in the illustrated embodiment the push/pull device 280 includes a first clevis 281a on one end and a second clevis 281b on the opposite end. The clevises 281 are attached to the body of the push/pull device 280 by threaded rods 283 that can be drawn into the body of the push/pull device 280 or extended out of the body of the push/pull device 280 by appropriate operation of a manual actuator 284 (e.g., a ratchet handle). Each of the clevises 281 can be releasably attached to the corresponding truss attachment portion 242 by a temporary fastener 282 (e.g., a bolt) that extends through the clevis 281 and the corresponding aperture 244a, 244b. After the push/pull device 280 has been coupled to the opposing truss attachment portions 242, the actuator 284 can be moved up and down in the appropriate direction to ratchet the spar end portions 225 together and/or apart as desired.

To join the first blade segment 220a to the second blade segment 220b in accordance with one embodiment of the present technology, a second push/pull device (not shown) is operably coupled between the third and fourth truss attachment members 241c, 241d on the first spar 221a, and a third push/pull device (also not shown) is operably coupled between the fifth and sixth truss attachment members 241e, 241f on the third spar 221c, as described above with reference to the second spar 221b. The spars 221 are then simultaneously pulled together by operation of the three push/pull devices 280 to "dry fit" the end portions 225 and confirm that they are properly aligned. After this has been done, the push/pull devices 280 are operated to separate the spar end portions 225 so that the end portions 225 can be suitably prepared for bonding as described in detail below.

Each of the end portions 225 can have a "finger joint" configuration, with recesses 245 of one end portion 225 aligned with projections 246 of the other. Once the end portions 225 of the spars 221 have been fit checked as described above, the overlapping surfaces of the recesses/projections 245/246 of the end portions 225 can be prepared for bonding. In a particular embodiment, the mating surfaces can be prepared for bonding by first sanding with an appropriate grade sandpaper, followed by a cleaning with acetone and/or a wipe with a lint-free cloth, followed by a wipe with isopropyl alcohol. A suitable adhesive (e.g., epoxy, polyurethane, methyl methacrylate, and/or other adhesive) can then be mixed and applied to the mating surfaces of the end portions 225. Enough adhesive is applied to the mating surfaces to adequately cover the zig-zag bond line. A localized or linear spacer made of suitable material can be laid on a surface of each spar 221 horizontal to the length of the spar. The end portions 225 of the spars 221 are then pulled together simultaneously by individual actuation of the (e.g., three) push/pull devices 280. As the end portions 225 move together, adhesive that squeezes out of the joint can be wiped away. In another arrangement, the blade assembler can first draw these end portions 225 together. The overlapping end portions 225 can then be clamped together with a pressure enclosure tool. After the end portions of the blade segments 220 have been suitably joined, the truss member 243 can be installed in the bay between the ribs 260 using, e.g., the apertures 244 in the attachment members 241. After the diagonal truss members have been attached to the blade segments, the push/pull device(s) 280 can be removed.

Prior to installing skins on the blade 210, the internal features of the lightning protection system 230 can be installed. For example, the cable portions (e.g., the second cable portion 234b) can be installed within the blade 210 and conductively attached to the first structure 240a. In an embodiment shown in FIG. 5, the second cable portion 234b is attached to the second truss attachment member 241b. In other embodiments, the second cable portion 234b can be attached to any electrically conductive portion of the first structure 240a that provides continuity with the first cable portion 234a (not shown in FIG. 5). The blade segments 220 can then be prepared for installation of skin panels onto the ribs 260.

Figure 6:
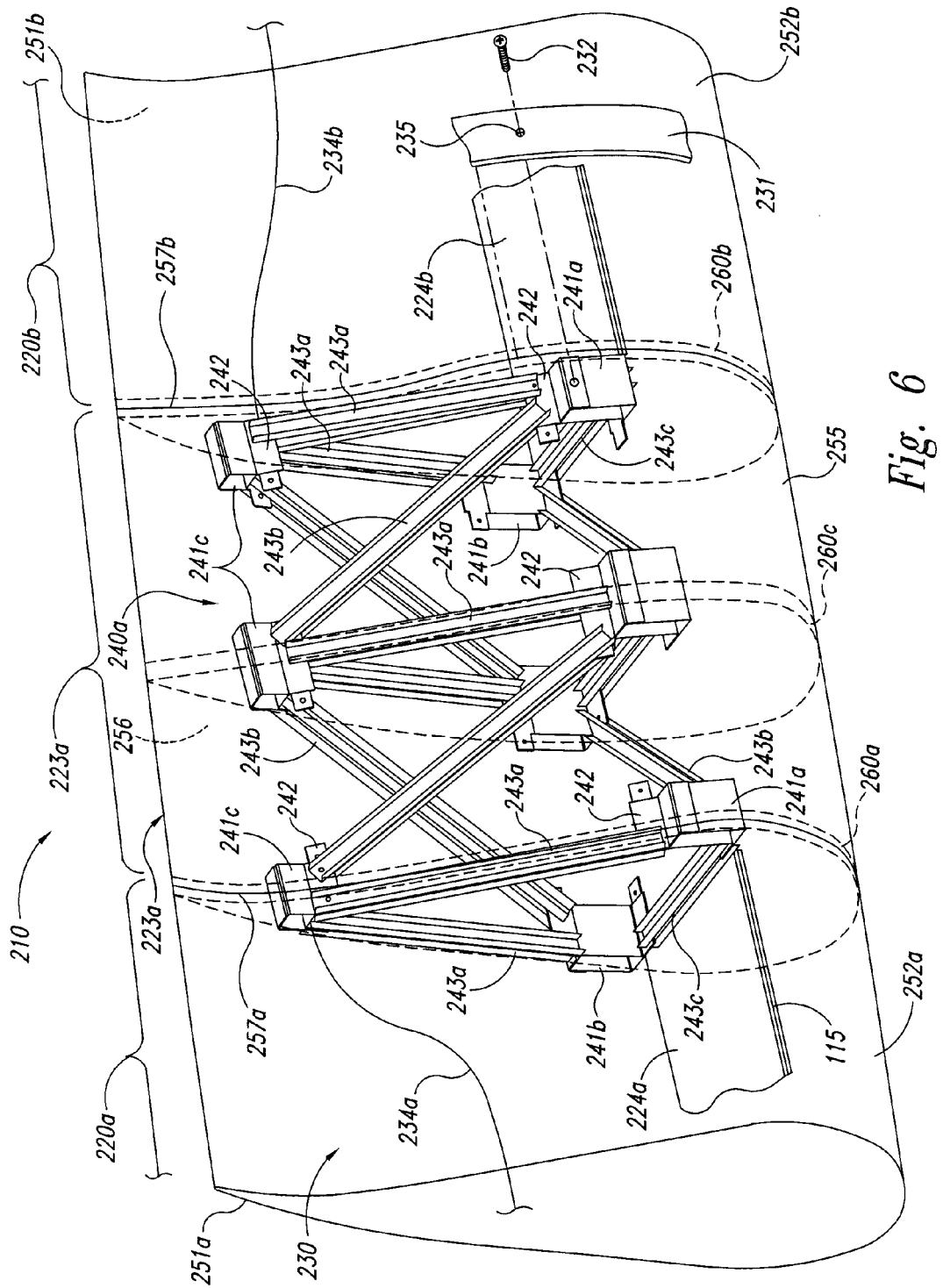
FIG. 6 is a partially schematic illustration of a portion of a wind turbine blade having skins and a lightning protection system installed in accordance with an embodiment of the present technology.

FIG. 6 is a partially schematic, isometric illustration of a portion of the first load-bearing structure 240a located at the first connection region 223a described above with reference to FIGS. 4 and 5. For purposes of illustration, several of the components of the blade 210 in this region (e.g., the spars) are not shown in FIG. 6. The first structure 240a provides a connection between the first segment 220a and the second segment 220b of the blade 210, as described above with reference to FIG. 5. Accordingly, the first structure 240a can include chordwise-extending first truss members 243a connected to the ribs 260 (shown as first, second and third ribs 260a, 260b, 260c, respectively). The first structure 240a can further include truss attachment members 241 (three are shown at each rib 260 as first truss attachment members 241a, second truss attachment members 241b, and third truss attachment members 241c) connected to the ends of the first truss members 243a, and connected to the spars (not shown in FIG. 6). The truss attachment members 241 can include truss attachment portions 242 (e.g., flanges) or other features that facilitate attachment to the truss members 243, e.g., via threaded fasteners or other fasteners. Transverse second truss members 243b can extend diagonally between truss attachment members 241 located at different ribs 260. Third truss members 243c are connected directly to the shear webs 224a, 224b so as to transmit shear loads across the first connection region 223a between the second shear web 224b and the first shear web 224a.

As is also shown in FIG. 6, the blade 210 includes skin panels mounted to the blade at the first segment 220a, the second segment 220b, and the first connection region 223a. In particular, the blade 210 can include a pressure side skin 252a and a suction side skin 251a at the first segment 220a, a pressure side skin 252b and a suction side skin 251b at the second segment 220b, and a pressure side connection skin 255 and suction side connection skin 256 at the connection region 223a. Skin joints 257 (e.g., shown as a first skin joint 257a at a first axial station and a second skin joint 257b at a second axial station) are located at the junctions between the skins at the first connection region 223a and the skins at the first and second segments 220a, 220b. The skins can be formed from conventional fiberglass, epoxy, fillers and paint in particular embodiments.

The lightning protection system 230 can include strips 231 positioned over the joints 257. For purposes of illustration, a portion of a single strip 231 is shown positioned over the second skin joint 257b. The strip 231 can include a conductive material (e.g., an aluminum tape, carbon layer, or steel sheet) that is bonded (adhesively or otherwise) to the skins at the second segment 220b and at the first connection region 223a. In a particular embodiment, the strip 231 can include a single strip that encircles the entire outer periphery of the blade 210 in a chordwise direction, and in other embodiments, the strip 231 can be formed from multiple segments. In any of these embodiments, the strip 231 can be electrically conductive and electrically continuous, and can be bonded to the first load-bearing structure 240a, at least a portion of which is also electrically conductive, via one or more conductive elements. In a particular embodiment, the lightning protection system 230 can include one or more connectors 232 (e.g., fasteners) that extend through the strip 231, or otherwise contact the strip 231, and attach to the truss attachment member(s) 241. Accordingly, the connectors 232 can be formed from aluminum or another electrically conductive material to provide an electrical path from the strip 231 to the first structure 240. In a particular embodiment, the connectors 232 include threaded connectors that are threadably engaged with the first truss attachment member 241a. The number of connectors 232 can be selected to (a) provide a conductive path capable of handling lightning-induced currents without damaging or excessively damaging the connectors, and (optionally), (b) secure the strip 231 in place. In other embodiments, the connector 232 can include other elements. For example, the connectors 232 can include studs that are attached to and extend outwardly away from the truss attachment members. The strip 231 can include a corresponding hole 235 that is fitted over the protruding stud. The protruding end of the stud can be swaged, welded, and/or otherwise bonded to the strip 231 to form an electrically conductive connection. In still further embodiments, the connector 232 can attach to the conductive strip 231 and/or the first structure 240a with other techniques, including interference fit techniques.

In a particular embodiment, strips 231 are positioned over only those ribs that underlie the skin joints 257, e.g., the first rib 260a underlying the first skin joint 257a, and the second rib 260b underlying the second skin joint 257b. In another embodiment, an additional strip can be positioned over the intermediate third rib 260c located between the first and second ribs 260a, 260b. In still further embodiments, additional strips can be placed at other locations on the blade 210. In any of these embodiments, at least some elements of the first structure 240a can be formed from aluminum or another conductive material so as to provide electrical continuity between portions of the lightning cable 233 that pass through the interior of the blade 210. For example, as shown in FIG. 6, the first structure 240a can provide electrical continuity between the first cable portion 234a located in the first segment 220a, and the second cable portion 234b located in the second segment 220b.

One feature of at least some of the foregoing embodiments is that the conductive elements can have a panel and/or strip configuration. Accordingly, the conductive elements can present a greater exposed area for electrical conduction than can conventional receptors. Another feature of at least some of the foregoing embodiments is that the conductive strips or panels can extend around some or all of the cross-section of the blade, and/or can be positioned at various stations along the length of the blade. The former feature can at least reduce the sensitivity of the lightning protection to changes in blade pitch, and the latter can at least reduce the sensitivity of the lightning protection system to blade altitude or elevation. Still another feature of at least some of these embodiments is that the conductive strips or panels can double as covers over the joints between adjacent skin sections. Accordingly, the strips or panels can replace existing layers that perform the covering function and can therefore avoid the use of a merely parasitic structure to perform lightning protection functions. In general, the conductive elements that form the conductive path from the exterior of the blade to ground can (and in some cases, must) withstand up to about 200,000 amps or more for very short durations, and have resistance values in the micro-ohm range or below to facilitate rapidly transmitting the very high, short-burst currents associated with lightning strikes.

From the foregoing, it will be appreciated that specific embodiments of the disclosed technology have been described herein for purposes of illustration, but that various modifications may be made without deviating from the disclosed technology. For example, in particular embodiments, the entire connection skin can be formed from an electrically conductive material to form a panel element as part of the lightning protection system, in addition to or in lieu of strips or panels providing such a function. The strips can in some cases provide the dual function of covering the skin joints between adjacent skin panels, and in other embodiments, can be placed over the skin in a region without a skin joint, for example, to provide for additional lightning protection, and/or to provide for lightning protection in regions that do not have a skin joint. The strips can be located at skin joints other than the chordwise skin joints described above. For example, the strips can be located at leading edge and/or trailing edge joints between pressure-side skins and suction-side skins. The chordwise-extending strips can extend around less than the entire section of the blade. The strips or other electrically exposed, electrically conductive elements can have a bare metal or other conductive surface in some embodiments. In other embodiments, the conductive elements can have surfaces that are protected (e.g., with a conductive or low-dielectric erosion-resistant coating 290, identified in FIG. 3) while remaining electrically exposed to the surroundings. Lightning protection at the tip of the blade can be performed by one or more strips and/or other structures, including receptors. The blades can include more or fewer than the three segments illustrated in the Figures. Discrete portions of the cable can be connected or otherwise coupled to the same or different components and/or locations of an overall structure. The structure can have the form of a truss, as discussed in the context of several embodiments described above, or the structure can have other load-bearing configurations.

Certain aspects of the disclosed technology described in the context of particular embodiments may be combined or eliminated in other embodiments. For example, cables having different dielectric characteristics can be used for lightning protection systems that do not include the conductive strips described above. Lightning protection systems that include the conductive strips described above can be used in conjunction with cables that do not have varying dielectric properties along the length of the wind turbine blade. In particular embodiments, any of the systems described above can be employed in the context of wind turbine blades that do not include at least some of the specific structural and/or functional details described above, including, but not limited to, segmented blade constructions. Further, while advantages associated with certain embodiments of the disclosed technology have been described in the context of those embodiments, other embodiments may also exhibit such advantages, and not all embodiments need necessarily exhibit such advantages to follow within the scope of the present technology. Accordingly, the present disclosure and associated technology can encompass other embodiments not expressly shown or described herein.

I claim:

1. A wind turbine blade system, comprising:
a wind turbine blade having an external skin including a hub region and a tip region;
at least one electrically exposed, electrically conductive element positioned at the external skin; and
an electrically conductive cable positioned inwardly from the external skin and conductively coupled to the at least one electrically exposed, electrically conductive element; and
a covering positioned around the cable, a first portion of the covering having a first dielectric value at a first portion of the cable that extends in a spanwise direction and is positioned toward the hub region, a second portion of the covering having a second dielectric value higher than the first dielectric value at a second portion of the cable that extends in a spanwise direction and is positioned toward the tip region.

2. The system of claim 1 wherein a transition between the first dielectric value and the second dielectric value is a step transition.

3. The system of claim 1 wherein a transition between the first dielectric value and the second dielectric value is a non-step change.

4. The system of claim 1 wherein the first dielectric value is a first dielectric strength and wherein the second dielectric value is a second dielectric strength higher than the first dielectric strength.

5. The system of claim 1 wherein the first portion of the covering has a first thickness and the second portion of the covering has a second thickness greater than the first thickness.

6. The system of claim 1 wherein the at least one electrically conductive element includes at least one panel.

7. The system of claim 1 wherein the at least one electrically conductive element includes at least one strip.

8. The system of claim 1 wherein the electrically conductive element includes a conductive material and a protective layer carried by the conductive material.

9. The system of claim 1, further comprising:
an internal structure positioned within the blade between the hub region and the tip region, the structure including at least one electrically conductive component and; and
wherein the first and second cable portions are electrically connected to the structure at different locations of the structure.

10. The system of claim 9 wherein the internal structure includes an internal truss structure.

11. The system of claim 1 wherein the first and second cable portions are continuous.

12. The system of claim 1 wherein the first and second cable portions are discontinuous, and wherein the system further comprises at least one intermediate conductive element coupled between the first and second cable portions.

13. A wind turbine blade system, comprising:
a wind turbine blade including an external skin having a hub region and a tip region, the external skin having neighboring skin portions and a joint between the neighboring skin portions;
a load-bearing structure positioned inwardly from the external skin to carry shear loads across the joint in a spanwise direction from one portion of the blade to another, the structure including at least one electrically conductive, load-bearing component;
at least one electrically exposed, electrically conductive element positioned at the joint of the external skin; and
an electrically conductive cable positioned inwardly from the external skin and conductively coupled to the at least one electrically exposed, electrically conductive element via the at least one electrically conductive component of the load-bearing structure.

14. The system of claim 13 wherein the at least one electrically conductive element includes at least one panel.

15. The system of claim 13 wherein the at least one electrically conductive element includes at least one strip.

16. The system of claim 13 wherein the electrically conductive element extends completely around a chordwise section of the external skin.

17. The system of claim 13 wherein the electrically conductive element extends completely around at least a portion of a chordwise section of the external skin.

18. The system of claim 13 wherein the electrically conductive element is adhesively bonded to the external skin.

19. The system of claim 13, further comprising an electrically conductive connector coupled between the electrically conductive element and the cable.

20. The system of claim 13, further comprising:
an electrically conductive connector coupled between the electrically conductive element and the electrically conductive component of the structure.

21. The system of claim 20 wherein the cable includes a first portion positioned toward the hub region and a second portion positioned toward the tip region, and wherein the first and second portions of the cable are connected to the at least one electrically conductive component of the structure, or to another electrically conductive component of the structure, or to both.

22. A wind turbine blade system, comprising:
an external skin having a hub region and a tip region and a joint between neighboring skin portions;
a load-bearing structure positioned inwardly from the external skin to carry shear loads across the joint, at least a portion of the load-bearing structure being electrically conductive;
at least one electrically exposed, electrically conductive element positioned at the external skin; and
an electrically conductive cable positioned inwardly from the external skin and conductively coupled to the at least one electrically exposed, electrically conductive element, the cable including a first cable portion coupled to the load-bearing structure and extending in a first spanwise direction, the cable further including a second cable portion spaced apart from and discontinuous with the first cable portion, the second cable portion being coupled to the load-bearing structure and extending in a second spanwise direction opposite the first, the first and second cable portions being conductively coupled to each other via the load-bearing structure.

23. The system of claim 22, further comprising a covering positioned around the cable, a first portion of the covering having a first dielectric value at a first portion of the cable positioned toward the hub region, a second portion of the covering having a second dielectric value higher than the first dielectric value at a second portion of the cable positioned toward the tip region.

24. The system of claim 22 wherein the at least one electrically conductive element includes at least one panel.

25. The system of claim 22 wherein the at least one electrically conductive element includes at least one strip.

26. The system of claim 22, further comprising a conductive connector electrically coupled between the conductive element and the load-bearing structure.

27. The system of claim 26 wherein the conductive connector is positioned to fasten the conductive element in position relative to the external skin.

28. A wind turbine blade system, comprising:
a first blade segment having a first external skin;
a second blade segment having a second external skin, the second blade segment being positioned axially outwardly from the first blade segment;
a truss structure connected between the first and second blade segments, the truss structure including electrically conductive truss members;
an external connection skin carried by the truss structure and positioned between the first and second external skins, the connection skin defining a first boundary at an interface with the first external skin and second boundary at an interface with the second external skin;
a first conductive strip encircling the first blade segment at a first axial station and positioned over the first boundary;
a second conductive strip spaced axially apart from the first conductive strip and encircling the second blade segment at a second axial station spaced apart from the first axial station and positioned over the second boundary;
a plurality of conductive connectors positioned to electrically couple the first and second strips to the truss structure;
an electrically conductive cable having a first portion positioned in the first segment and connected to the truss structure, and a second portion positioned in the second segment and connected to the truss structure, the first and second portions being discontinuous; and
a covering positioned around the cable, the covering having a first dielectric strength at the first portion of the cable and a second dielectric strength higher than the first dielectric strength at the second portion of the cable.

29. The system of claim 28 wherein the first strip is adhesively attached to the first external skin and the connection skin, and the second strip is adhesively attached to the second external skin and the connection skin.

30. A wind turbine blade system, comprising:
a wind turbine blade having a first segment and a second segment, the blade including an external skin having a hub region and a tip region;
a load-bearing structure positioned inwardly from the external skin to connect the first and second segments, the structure including at least one electrically conductive, load-bearing component;
first and second axially spaced-apart, electrically exposed, electrically conductive strips positioned at the external skin with the load-bearing structure positioned between the first and second strips; and
an electrically conductive cable positioned inwardly from the external skin and conductively coupled to the electrically exposed, electrically conductive strips via the at least one electrically conductive component of the load-bearing structure.

* * * * *